No. 64,538.  PATENTED MAY 7, 1867.
S. W. JAMISON.
BOOT CRIMPING MACHINE.
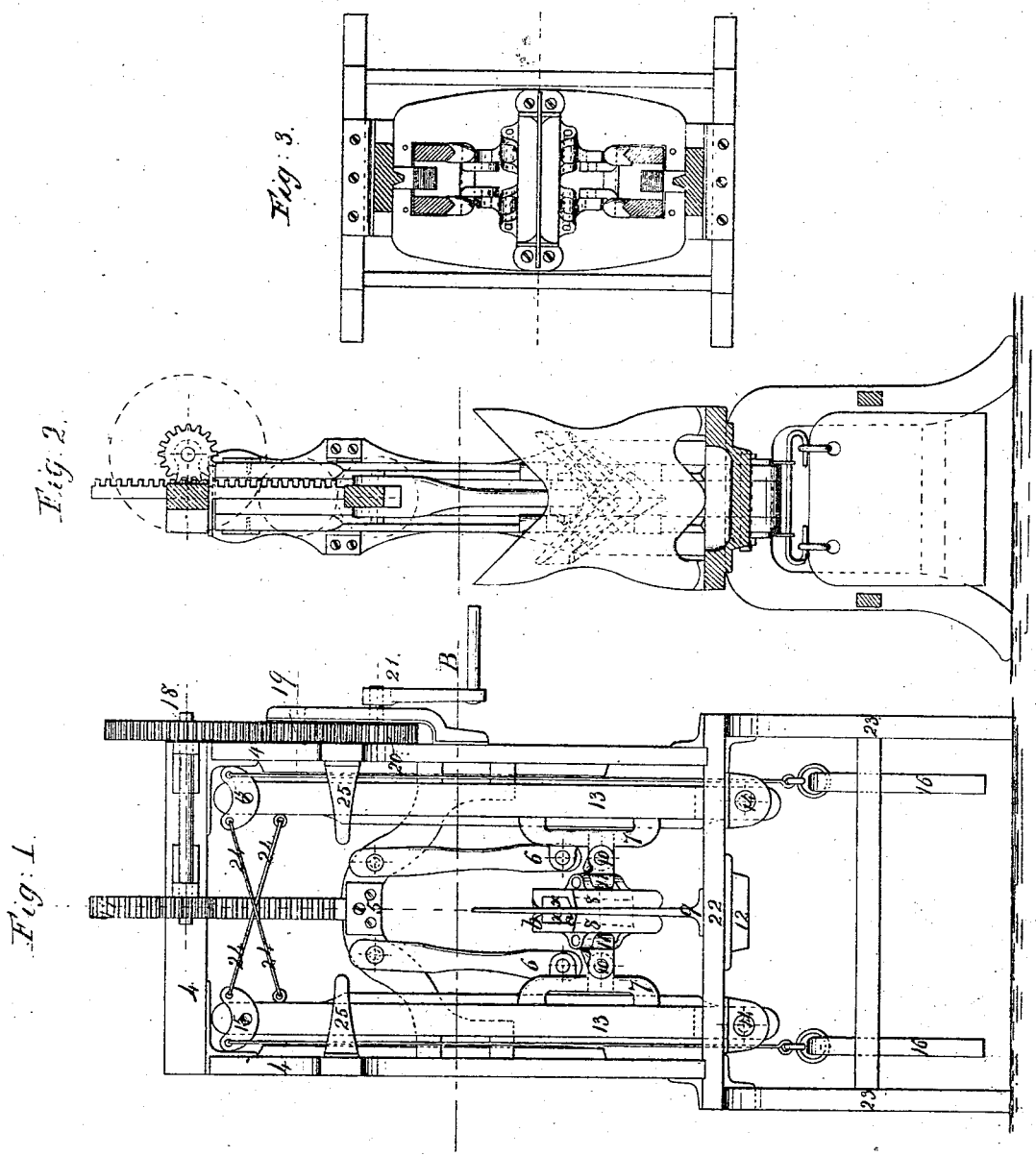
Inventor;
Saml. W. Jamison
by J. Pollok
Atty

United States Patent Office.

SAMUEL W. JAMISON, OF NEW YORK, N. Y.

Letters Patent No. 64,538, dated May 7, 1867.

---

IMPROVED BOOT-CRIMPING MACHINE.

---

The Schedule referred to in these Letters Patent and making part of the same.

---

TO WHOM IT MAY CONCERN:

Be it known that I, SAMUEL W. JAMISON, of New York, in the county and State of New York, have invented certain new and useful improvements in Machines for Crimping Leather for Boots; and I hereby declare the following to be a full, clear, and exact description of the same, reference being had to the accompanying drawings, in which—

Figure 1 represents a front elevation of my improved machine.

Figure 2 is a transverse vertical section; and

Figure 3, a horizontal section on the line A B, fig. 1.

The object of my invention is to economize the time and labor usually expended in crimping or shaping and stretching boot-fronts, and to produce an apparatus which shall supersede the ordinary means employed in this process, being simple in construction and inexpensive, so as to be within the reach of all classes of shoemakers or manufacturers. A machine of this kind has long been desired and needed by the trade, for the method of crimping boots by hand, which is the one usually employed, not only results in considerable loss of time and labor, but the work itself is not done with that regularity and uniformity which can only be attained by the use of machinery. Under my invention the leather, after being placed on the tree or form, is crimped by means of parallel plates, which are operated by gear, so as to pass up and down on each side of the tree, being pressed lightly against it by weights, which cause the crimpers or plates to completely smooth out the wrinkles which gather on the leather during the process. My invention, therefore, may be said to principally consist in the combination with a stationary tree or form of movable and adjustable crimping-plates moving up and down in the machine on each side of the tree, and arranged so as to conform to the varying shape of the tree, and to subject the leather on the tree to any degree of pressure that may be desired. My invention further consists in the construction of the crimping-plates, and in the method of joining or hinging them to the sliding-frame or brackets by which they are supported; and it also consists in the means by which the plates are at all times, during their upward and downward movement, acted on by weights, which produce the pressure by which the leather on the tree is caused to be stretched and shaped.

To enable those skilled in the art to fully understand and use my invention, I will now proceed to describe the manner in which the same is or may be carried into effect, by reference to the accompanying drawings.

The working parts of the apparatus are supported by the frame 4, the upright sides of which form the ways in which the cross-head 5, from which the crimpers are suspended, moves. From the centre part of the cross-head a rack, 17, extends, which slides in a recess formed in the top part of the frame 4, and engages with a pinion supported in the upper cross-piece of the frame, and actuated by gear 18, 19, 20, so as to cause the cross-piece 5 to be raised or lowered. On each side of the rack rods 6 are pivoted to the cross-head, their lower ends being pivoted or hinged to bracket-shaped pieces, 7, which support the crimping-plates or burnishers 8. Each crimping-plate 8 is divided vertically into two sections, which are formed so that when placed together the contour of the lower end of the plate shall conform to the curve or bend of the tree 9. The object of thus constructing the plates is to allow them to freely adjust themselves to the varying dimensions of the tree, which they could not well do were they made each of a single piece; and for this same reason, instead of being directly pivoted to the sliding brackets, they are connected therewith by means of an intermediate yoke or forked piece, A, which is pivoted to the brackets at 10, and at 11 to each one of the sections of the plates upon the respective sides of the machine, in such manner that the axis of motion at the joints 11 shall be transverse to that at the pivoted points 10. It will thus be seen that the crimping-plates are so constructed, and combined with the cross-head by a series of jointed or hinged connections, as to be perfectly free to move in any direction required in order to conform to the shape of the tree, and thus keep in complete contact with the leather. The brackets 7 do not, like the cross-head 5, slide in the sides of the frame of the apparatus, but they are arranged so as to move on self-adjusting ways 13. These self-adjusting ways are composed of uprights pivoted at their lower ends, 14, to each side of the frame of the machine, and connected together at their upper ends by means of rods 24. One end of each of these rods is attached directly to one of the uprights 13, and the other end extends diagonally across to the opposite upright, where it is attached to one extremity of a lever, 15, pivoted to the upright. The other end of the lever has attached to it a rod or chain, which hangs down between the fixed uprights 4 and the movable ways 13, and has attached to its lower end a weight, 16. It will be readily seen that this method of weighting the levers 15 tends to draw together the ways 13, and consequently the brackets 7, which slide on these ways. The crimping-plates 8 will, therefore, be forced tightly together, and whenever moved down upon the tree 9, will exert a pressure upon the leather proportionate to the weights employed. The interior faces of the crimping-plates are recessed, as shown at $x$, figs. 1 and 2, so as to leave two bars, $a$ $b$, which act as burnishers. The tree or form 9 upon which the leather is placed is attached to the bed of the machine, and is in the same vertical plane with the plane of contact of the crimping-plates. Underneath the tree is a cup or basin, 12, in the bed 22 of the machine, for catching the water or drippings from the leather.

The operation of the apparatus is as follows: The crank 21 is turned so as to raise the crimpers 8 from the tree 9. The leather, which has of course been previously soaked, is then placed on the tree in any suitable manner, and then, by means of the crank 21, the gear and pinion 18, 19, 20 are revolved so as to move the rack 17 downwards, which of course causes a corresponding movement of the plates 8. As soon as these latter, in their downward course, meet with the wedge-shaped edge of the tree 9, they are separated, one passing down each side of the tree. This outward movement or separation of the two plates causes the self-adjusting ways 13 to also move apart, slightly raising the weight 16 by means of the levers 15. As the crimping-plates move further down upon the gradually thickening tree, the distance between them is increased, and the ways 13 are moved farther apart, being guided and steadied in this movement by the arms 25, between which they are held. The pressure, by means of the lever connection between the weights and ways 13, increases as the crimping-plates approach the lower part of the leather, or that part of it in which the wrinkles are most numerous and stubborn, and thus all parts of the leather are thoroughly pressed by the crimping-plates or burnishers, which, as above explained, by reason of their sectional construction and jointed connection with the cross-beam 5, are capable of adjusting themselves to any shaped tree. The drippings pressed from the wet leather by the crimpers during their descent fall into the pan 12, from whence they may be removed whenever necessary. The ways 13 are in every sense of the word self-adjusting. By exerting a yielding pressure, which may be increased or diminished at pleasure by adding to or taking from the weights 16, they can conform to every lateral movement of the crimping-plates, while they at all times press the two plates towards each other with any desired degree of power. By the use of the apparatus I have described, one man can do, per day, the work of from fifteen to twenty men who crimp boot-fronts by ordinary hand-labor, and he will do his work not only with great rapidity, but more perfectly and uniformly than can be done by them. The pressure that may be brought to bear upon the material enables him to crimp and burnish the leather with great rapidity, especially as the crimpers, from their construction and jointed connection, are held in direct and entire contact with the surface upon which they are required to operate. It will be understood that the self-adjusting ways 13 may be made to press the crimping-plates together by means of springs placed between them and the uprights 4 of the frame, or in any other suitable manner.

Having described my invention, and the manner in which the same is or may be carried into effect, what I claim, and desire to secure by Letters Patent, is as follows:

1. The combination, in a machine for crimping boots having a stationary tree or form, of the crimping-plates with the brackets for supporting the same, under the arrangement herein described, so that the said plates may adjust themselves vertically or laterally to the varying thickness of the leather or tree upon which it is placed, substantially as shown and set forth.

2. The combination, with the crimping-plates and brackets for supporting the same, of the laterally self-adjusting ways between which the said brackets slide, the said ways being actuated by weights, springs, or equivalent mechanism, to exert a continuous but yielding pressure upon the said crimping-plates, as herein shown and described.

3. The method of supporting the said crimping-plates, and the supporting brackets, moving between laterally self-adjusting ways as described, from a cross-head or beam sliding between the sides of the machine, and receiving motion through the medium of gear or lever, or other suitable mechanism, substantially as herein shown and set forth.

4. The combination, with the self-adjusting ways or uprights, of the levers and rods connecting the same with both the said uprights and the weights, under the arrangement and for operation substantially as shown and set forth.

In testimony whereof I have signed my name to this specification before two subscribing witnesses.

S. W. JAMISON.

Witnesses:
  W. C. ALBURTUS,
  FRANK ROLLINS.